United States Patent [19]
Apte

[11] Patent Number: 5,778,173
[45] Date of Patent: Jul. 7, 1998

[54] MECHANISM FOR ENABLING SECURE ELECTRONIC TRANSACTIONS ON THE OPEN INTERNET

[75] Inventor: Jitendra Apte, Woodbridge, N.J.

[73] Assignee: AT&T Corp., Middletown, N.J.

[21] Appl. No.: 664,019

[22] Filed: Jun. 12, 1996

[51] Int. Cl.[6] .................................................. H04K 1/00
[52] U.S. Cl. .................................. 395/187.01; 380/25
[58] Field of Search .............................. 395/186, 187.01, 395/188.01; 380/4, 23, 25

[56] References Cited

U.S. PATENT DOCUMENTS

| | | | |
|---|---|---|---|
| 5,283,829 | 2/1994 | Anderson | 380/24 |
| 5,329,589 | 7/1994 | Fraser et al. | 379/91 |
| 5,590,197 | 12/1996 | Chen et al. | 380/24 |
| 5,657,390 | 8/1997 | Elgamal et al. | 380/49 |

OTHER PUBLICATIONS

Santo, Brian "Bill-paying put on-line" <Electronic Engineering Times, N840, p. 82(1), 1995.
Globe ID "The Global ID Payment System" Spring 1994.
Press Release for CARI "The Internet Voice robot" (REF (A)), 1995.

*Primary Examiner*—Albert Decady

[57] ABSTRACT

A method is provided for performing a transaction that is initiated over an open communication network between a user and a remotely located server. The open communication network may be the Internet, for example. In accordance with one embodiment of the method, a transaction identification number is received from the remotely located server over the open network and subsequently, communication between the user and the remotely located server is discontinued. Communication is established between the user and a transaction server. The transaction server is operatively coupled to the user and the remotely located server over a communication network which is isolated from the open network. The transaction identification number is transmitted to the transaction server over the communication network. After the transaction server confirms the validity of the transaction identification number, in response to a request from the transaction server, a transaction authorization number is transmitted over the communication network to the transaction server to complete the transaction.

31 Claims, 2 Drawing Sheets

5,778,173

MECHANISM FOR ENABLING SECURE ELECTRONIC TRANSACTIONS ON THE OPEN INTERNET

FIELD OF THE INVENTION

This invention relates generally to a method for performing secure transactions on open communication networks and, in particular, to a method and apparatus for performing transactions such as purchases over the World Wide Web.

BACKGROUND OF THE INVENTION

Open public networks such as the Internet, and in particular the World Wide Web, have undergone tremendous growth as a distribution channel for businesses. These businesses typically provide an Internet site to promote one or more products or services. Of course, it would be convenient if customers could actually complete a transaction and purchase a product or service over the Internet. However, it is currently difficult to secure data traffic that traverses the Internet because the Internet is an open environment with no guarantees of data privacy and thus a third party can access or alter the data as it is in transit. Consequently sensitive data such as credit card numbers cannot be transmitted over the Internet with adequate assurances of security.

A variety of techniques have been explored to secure data on the Internet. Many of these techniques involve data encryption, which may provide adequate security for a limited time. However, encryption techniques are continuously in jeopardy of being broken because technologies to break encryption schemes are being developed as rapidly as the encryption techniques themselves and because the computing power and communication systems needed for decryption are fast becoming ubiquitous and cheap. Moreover, in addition to the technological problems of providing security on the Internet, there is a large socio-cultural impediment to performing electronic transactions on the Internet simply because people question its security. Accordingly, it would be desirable to provide a convenient method for performing a reasonably secure transaction over the Internet.

SUMMARY OF THE INVENTION

The present invention provides a method for performing a transaction that is initiated over an open communication network between a user and a remotely located server. The open communication network may be the Internet, for example. In accordance with one embodiment of the method, a transaction identification number is received from the remotely located server over the open network and subsequently, communication between the user and the remotely located server is discontinued. Communication is established between the user and a transaction server. The transaction server is operatively coupled to the user and the remotely located server over a communication network which is isolated from the open network. The transaction identification number is transmitted to the transaction server over the communication network. After confirming the validity of the transaction identification number, the transaction server requests a transaction authorization number. In response to this request, a transaction authorization number is transmitted over the communication network to the transaction server to complete the transaction.

The transition in communication between the remotely located server and the transaction server may occur automatically upon a request from the user to complete the transaction. Accordingly, the user can perform a secure transaction in an extremely convenient manner.

DETAILED DESCRIPTION

Figure 1:
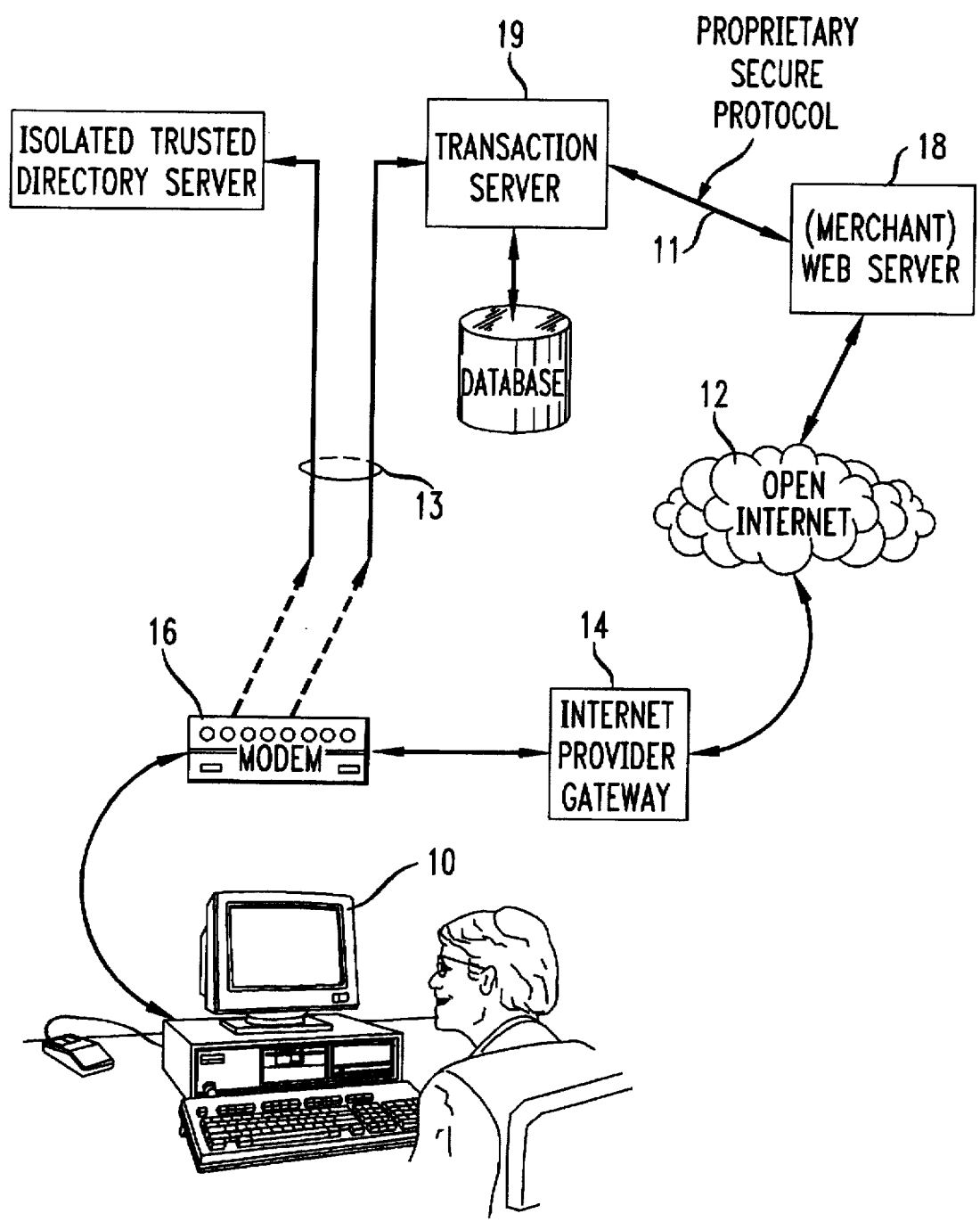
FIG. 1 shows an example of a system constructed in accordance with the present invention which is incorporated into the World Wide Web.

The present invention allows an individual to browse the open World Wide Web (WWW) and in a seamless manner perform secure transactions over a secure electronic communication medium that is isolated from the WWW. Such secure communications media are often employed by banks, for example, to allow customers to perform home banking over a personal computer. These secure communication media typically employ an encrypted proprietary protocol operating over a telephone link (i.e., a circuit switched POTS connection). FIG. 1 shows an example of a system in accordance with the present invention which is incorporated into the WWW.

A personal computer 10 or other data processing device is coupled to the open Internet 12, and in particular the WWW, via an Internet provider gateway 14. The computer 10 interfaces with the gateway 14 via an input/output device 16 that typically includes a modem. The computer 10 may be employed by a user to search the WWW with a web browser in a conventional manner and communicate with a remotely located server 18 that may represent, for example, a vendor advertising a product or service. Examples of web browsers include Netscape's Navigator and Microsoft's Internet Explorer, for example.

Currently, if the user desires to purchase the product or service from the vendor, the user provides a credit card number over the network thus potentially allowing a third party access to the card number, even if an encryption technique is employed. In accordance with the present invention, however, this problem is avoided because sensitive data is never transmitted over the open WWW. Rather, in response to the user's request to make a purchase, the vendor 18 transmits a purchase order number both to the user 10 over the WWW and to a transaction server 19 that is isolated from the Internet. The vendor 18 communicates with the transaction server 19 over any desired communication system 11 that is isolated from the Internet. This system 11 may employ a proprietary protocol that operates over a telephone link such as any of those conventionally used for banking.

The user subsequently pays for the purchase by initiating communication between the computer 10 and the transaction server 19 over another communication system 13 that is isolated from the WWW and which also may employ a proprietary protocol operating over a telephone link. The user provides the purchase order number to the transaction server 19 and proceeds to complete the purchase by providing a credit number. Since the transaction server 19 is isolated from the open WWW the inherent risks of communicating sensitive information is avoided. The transaction between the user and the transaction server has a degree of security at least equivalent to the security provided by a conventional telephone and preferably to the level of security provided by proprietary home banking, tax filing, or bill paying communication systems. A system employing a proprietary protocol to transmit data over the telephone system is advantageous because consumers by and large believe that transmitting sensitive data in this manner (by speaking or faxing the data, for example) is secure. Support for this belief is provided by the success of on-line banking, tax filing and bill paying systems.

It should be noted that the term "isolated" as used herein refers to isolation with respect to information transport and not physical isolation. For example, portions of the communications system 13 and the Internet 12 may share the same physical links such as the user's local telephone line. However, the communication system 13 and the Internet 12 do not communicate with one another.

In accordance with one aspect of the invention, the user is provided with software to be executed on the computer 10 which automatically performs the transition in communication from the WWW 12 to the transaction server 19 so that the details involved are invisible to the user. That is, when the user wishes to place an order, there is no need to manually disconnect from the WWW 12 and initiate communication with the transaction server 19 over the isolated communication system. Rather, the software residing in the computer 10 performs the transaction so that the user may even be unaware that the computer 10 has disconnected from the WWW and initiated communication with another network.

Figure 2:
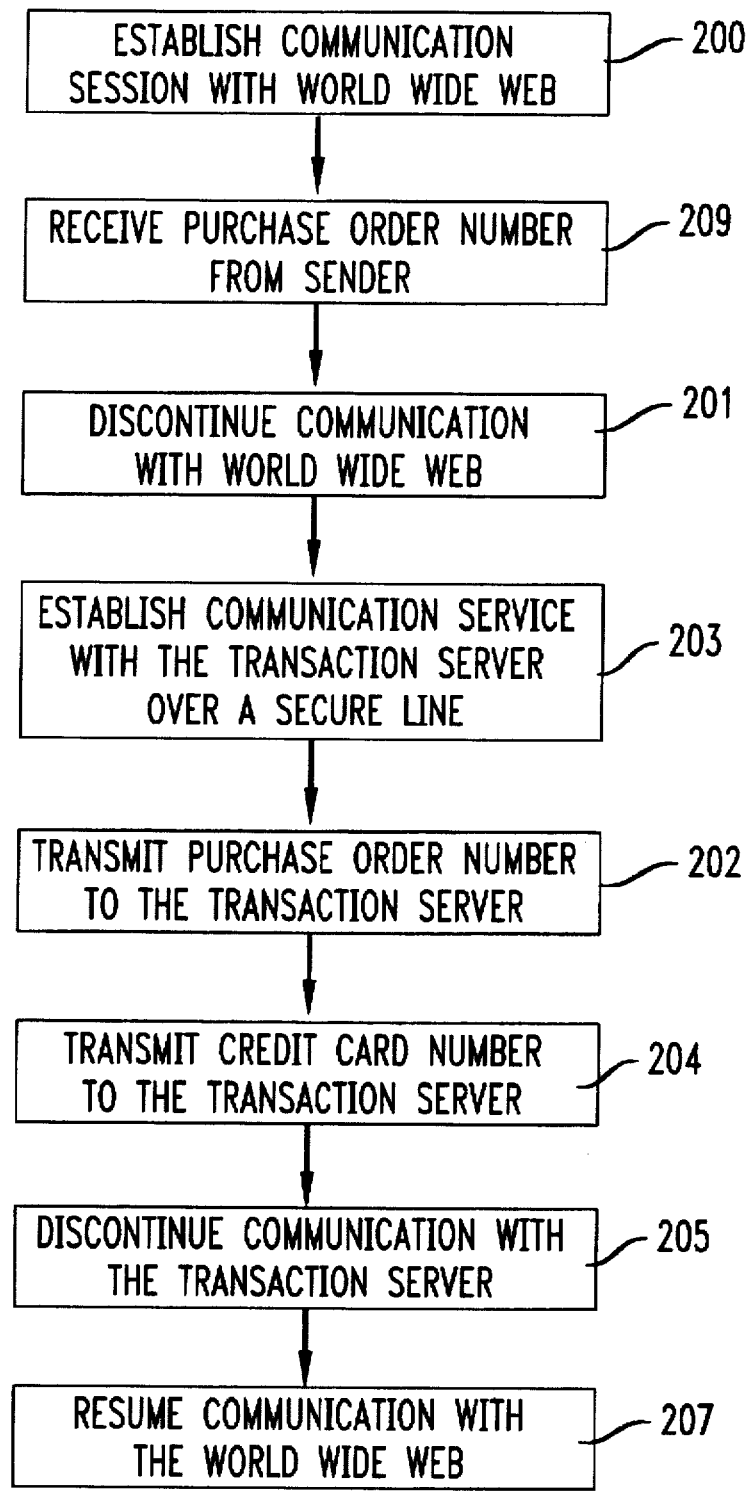
FIG. 2 shows a flow diagram illustrating one embodiment of the process used to purchase an item from the World Wide Web in accordance with the present invention.

FIG. 2 shows a flow diagram illustrating one embodiment of the process used to purchase an item from the WWW in accordance with the present invention. Each block in FIG. 2 identifies the operations to be performed by the personal computer to provide the functionality contemplated by the present invention. It should be noted that the operations performed by the computer may be implemented programically by software residing on the computer or by direct electrical connections through customized integrated circuits or by a combination of both.

The process begins in step 200, in which communication is established between the computer and the WWW in a conventional manner. The user browses public sites on the WWW and ultimately decides to purchase a product or service from a vendor. The user's computer receives the purchase order number in step 209 of FIG. 2. The vendor generates a purchase order number in response to the user's request and transmits the order number to both the transaction server and the user's computer 10. The vendor directs the user to contact the appropriate transaction server and may additionally provide the user with the server's telephone number, which may, for example, be an 800 number. The telephone number may be unique to the particular transaction server or it may be unique to both the transaction server and the vendor (so that each transaction server can receive requests in connection with different vendors each having a unique telephone number). Moreover, the present invention contemplates the provision of a plurality of transaction servers as demand warrants and in some cases vendors may work in cooperation with more than one transaction server.

In step 201 communication between the WWW and the computer is suspended by either discontinuing the communication session or by placing the connection to the WWW in a hold state via a three-way calling service. In step 203 the computer establishes communication with the transaction server over the secure network. As previously noted, the vendor may provide the user with the appropriate telephone number. This may be accomplished in a simple manner by having the vendor display the telephone number on its web page. However, this scheme may not be sufficiently secure because a third party could potentially alter the telephone number while it is being transmitted from the server to the user, thereby fraudulently obtaining the user's credit card number by having the user call a telephone number accessible to the third party.

In yet another alternative embodiment of the invention, the telephone number of the transaction server may be locally stored in the computer or, alternatively, the user may retrieve the appropriate telephone number from a directory located in the secure communication system which includes the transaction server. The telephone number of the directory may be stored in the computer or it may be provided by the vendor. The directory may reside on the transaction server itself or it may reside in another component in communication with the secure system. In one particular embodiment of the invention, the computer first uses the Universal Resource Locator (URL) of the vendor and attempts to retrieve the phone number for its transaction server from a locally stored directory. If the number is not found, the computer automatically dials the directory located on the secure network and downloads the appropriate telephone number. If the telephone number is still not found, the computer prompts the user to provide the appropriate number. Finally, if the number is unavailable, the attempted transaction is aborted and the computer returns to vendor's site on the WWW, which had been on hold. In this situation customer service should be called.

Returning to step 203, after communication has been established with the transaction server, the user provides the server with the purchase order number in step 202. The transaction server locates the purchase order and may echo to the user a list of the products or services to be purchased. The user approves the purchase and in step 204 provides a credit card number to complete the transaction. Once the transaction between the computer and the transaction server is complete, the computer ends the communication session with the transaction server in step 205 and resumes communication with the WWW in step 207. The transaction server subsequently transmits the completed order back to the vendor or directly to a shipping department.

In one embodiment of the invention, the communication session between the computer 10 and the transaction server is configured to appear to the user as a WWW communication session. That is, the interface between the computer 10 and the transaction server is designed to function in a format similar to a WWW browser so that the user is virtually unaware that the computer has suspended communication on the WWW and initiated communication over a secure network isolated from the WWW. From the user's perspective this advantageously simplifies the task of purchasing an item over the WWW in a relatively secure manner.

In accordance with one aspect of the invention, the purchase order number provided to the user may be randomly generated by the vendor's server. This feature prevents unauthorized users from dialing in to the transaction server and attempting to access orders by trying arbitrary purchase order numbers. Additionally, the transaction server can limit the user to a predetermined number (e.g. three) of incorrect order numbers before terminating the connection.

In the embodiment of the invention discussed in connection with FIG. 2, the user's computer 10 initiated contact with the transaction server, as opposed to the transaction server initiating contact with the user. While the present invention encompasses both procedures, the former procedure is advantageous because if the latter procedure is used, an unauthorized party on the open Internet could detect a message from the user to the vendor requesting a return call for credit card authorization. This party could then call the user, thus emulating the transaction server to fraudulently acquire the user's credit card number.

It will be appreciated that those skilled in the art will be able to devise numerous arrangements which although not explicitly shown or described herein. embody the principles of the invention. Accordingly, all such alternatives, modifications and variations which fall within the spirit and broad scope of the appended claims will be embraced by the principles of the invention. For example, while the invention has been described in connection with FIGS. 1 and 2 as a method for completing a transaction on the Internet, the invention is more broadly applicable to a method for completing a transaction on other open communication systems as well.

I claim:

1. A method for performing a transaction initiated over an open communication network between a user and a remotely located server, comprising the steps of:

a. receiving a transaction identification number from the remotely located server over the open network;
   b. automatically discontinuing communication between said user and said remotely located server responsive to a request from said user to complete the transaction;
   c. automatically establishing communication between said user and a transaction server responsive to the request from said user to complete the transaction, said transaction server being operatively coupled to said user and said remotely located server over a communication network isolated from said open network contemporaneous with step (b) and substantially seamless to said user;
   d. transmitting said transaction identification number to said transaction server over said communication network;
   e. after the transaction server confirms validity of the transaction identification number, transmitting over said communication network, in response to a request from said transaction server, a transaction authorization number to said transaction server to complete the transaction.

2. The method of claim 1 wherein communication between said user and said transaction server is configured to appear as a World Wide Web communication.

3. The method of claim 1 wherein communication over said communication network between said user and said transaction server employs an encrypted protocol at least in part operating over a telephone link.

4. The method of claim 1 wherein said open network comprises the Internet.

5. The method of claim 4 wherein said open network comprises the world wide web.

6. The method of claim 1 wherein said user is in communication with said remotely located server and said transaction server over a personal computer.

7. The method of claim 1 wherein said remotely located server is employed by a vendor to advertise on the open network.

8. The method of claim 7 wherein said transaction comprises a purchase.

9. The method of claim 8 wherein said transaction authorization number is a credit card number.

10. The method of claim 1 wherein step (a) further comprises the step of receiving from said remotely located server a telephone number of said transaction server.

11. The method of claim 1 wherein step (b) includes the step of suspending communication between said user and said remotely located server by placing said remotely located server in a hold state.

12. The method of claim 1 wherein said communication in step (c) is initiated by said user.

13. The method of claim 12 wherein said user initiates communication with said transaction server by performing the step of retrieving a locally stored telephone number of said transaction server.

14. The method of claim 12 wherein said user initiates communication with said transaction server by retrieving a telephone number from a directory located in said communication network.

15. The method of claim 5 wherein said transaction is initiated by the user using a World Wide Web browser.

16. The method of claim 1 further comprising the steps of:

f. discontinuing communication between said user and said transaction server after completion of step (e);
   g. resuming communication between said user and said remotely located server contemporaneous with step (f) and substantially seamless to said user.

17. The method of claim 16 wherein steps (f) and (g) occur automatically after completion of step (e).

18. A computer readable medium having a computer program encoded thereon for performing a transaction initiated over an open communication network between a user and a remotely located server, comprising:

a first portion of said medium having a first program segment for receiving a transaction identification number from the remotely located server over the open network;
   a second portion of said medium having a second program segment for automatically discontinuing communication between said user and said remotely located server responsive to a request from said user to complete the transaction;
   a third portion of said medium having a third program segment for automatically establishing communication between said user and a transaction server over a communication network isolated from said open network responsive to the request from said user to complete the transaction, and seamless to said user and contemporaneous with automatically discontinuing communication performed by said second program segment;
   a fourth portion of said medium having a fourth program segment for transmitting said transaction identification number to said transaction server over said communication network;
   a fifth portion of said medium having a fifth program segment for transmitting over said communication network, after the transaction server confirms validity of the transaction identification number and in response to a request from said transaction server, a transaction authorization number to said transaction server to complete the transaction.

19. The medium of claim 18 wherein said third, fourth and fifth program segments are executed such that communication between said user and said transaction server is configured to appear as a World Wide Web communication.

20. The medium of claim 18 wherein said third, fourth, and fifth program segments employ an encrypted protocol operating at least in part over a telephone link.

21. The medium of claim 18 wherein said open network comprises the Internet.

22. The medium of claim 21 wherein said open network comprises the World Wide Web.

23. The medium of claim 18 wherein said remotely located server is employed by a vendor to advertise on the open network.

24. The medium of claim 23 wherein said transaction comprises a purchase.

25. The medium of claim 24 wherein said transaction authorization number is a credit card number.

26. The medium of claim 18 wherein said first program segment further receives from said remotely located server a telephone number of said transaction server.

27. The medium of claim 18 wherein said second program segment suspends communication between said user and said remotely located server by placing said remotely located server in a hold state.

28. The medium of claim 18 wherein said third program segment initiates communication between said user and said transaction server.

29. The medium of claim 28 wherein said third program segment initiates communication with said transaction server by retrieving a locally stored telephone number of said transaction server from a sixth portion of said medium.

30. The medium of claim 28 wherein said third program segment initiates communication with said transaction server by retrieving a telephone number from a directory located in said communication network.

31. The medium of claim 22 further comprising a sixth portion of said medium having a sixth program segment for browsing on the World Wide Web.

* * * * *